United States Patent [19]

Ward

[11] E Re. 29,337

[45] Reissued Aug. 2, 1977

[54] DICARBOXYLIC ACID SOAPS

[75] Inventor: Benjamin F. Ward, Isle of Palms, S.C.

[73] Assignee: Westvaco Corporation, New York, N.Y.

[21] Appl. No.: 654,862

[22] Filed: Feb. 3, 1976

Related U.S. Patent Documents

Reissue of:

[64] Patent No.: 3,734,859
Issued: May 22, 1973
Appl. No.: 188,458
Filed: Oct. 12, 1971

[51] Int. Cl.[2] ..... C11D 9/00

[52] U.S. Cl. ..... 252/108; 252/117; 252/89 R; 252/132; 252/DIG. 14; 252/367; 252/368; 260/515 P

[58] Field of Search ..... 252/108, 117, 367, 368, 252/89, DIG. 14, 132; 260/515 P

[56] References Cited

U.S. PATENT DOCUMENTS 3,630,927 12/1971 Shen ..... 252/117

FOREIGN PATENT DOCUMENTS 1,032,363 6/1966 United Kingdom

*Primary Examiner*—Mayer Weinblatt
*Attorney, Agent, or Firm*—Richard L. Schmalz; Ernest B. Lipscomb, III

[57] ABSTRACT

Dicarboxylic acid soap compositions comprising a compound of the formula

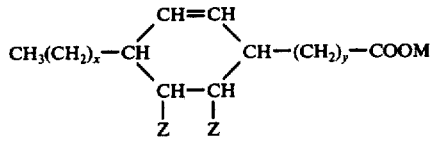

wherein x and y are integers from 3 to 9, x and y together equal 12, Z is a member of the group consisting of hydrogen and $COOM_1$, with one Z of each moiety, and M and $M_1$ are selected from the group consisting of hydrogen, sodium potassium, lithium, ammonium, organic amines, and mixtures thereof in an amount sufficient to impart detergency to said compositions, and water. Another aspect of this invention is that soap of the above composition may be blended at from 5% to 90% by soap weight with coconut fatty acids, tallow fatty acids, tall oil fatty acids, oleic acid, soya fatty acids, safflower oil and other fatty acids, and retain the advantageous properties of using $C_{21}$ dicarboxylic acid soaps alone. The soaps and soap blends are water soluble not only at low solids concentration but also at high solids concentration, for example, above 40% solids and in some cases above 90% solids. The soap compositions find utility among other places as liquid hand soaps, cleaning aids and shampoos.

16 Claims, 1 Drawing Figure

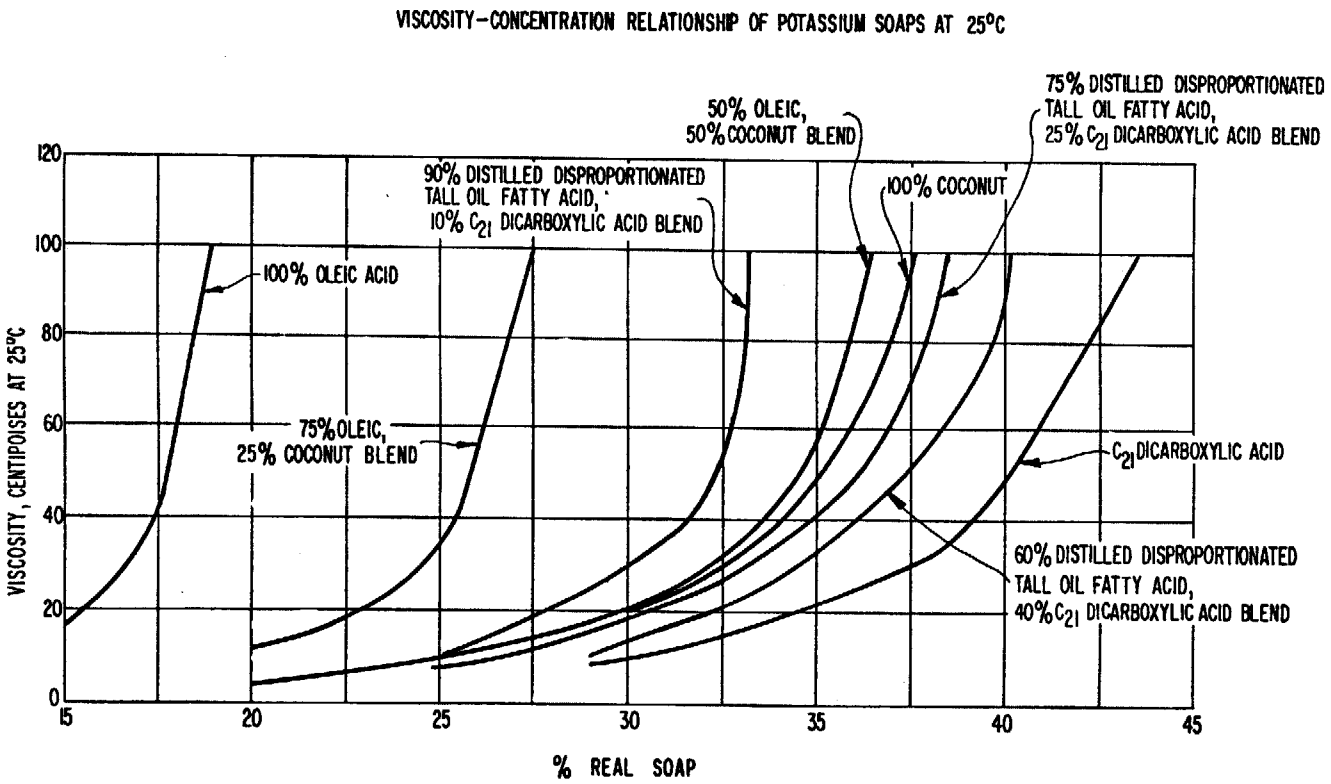
VISCOSITY-CONCENTRATION RELATIONSHIP OF POTASSIUM SOAPS AT 25°C
VISCOSITY, CENTIPOISES AT 25°C
% REAL SOAP
0
20
40
60
80
100
120
15
20
25
30
35
40
45
100% OLEIC ACID
75% OLEIC, 25% COCONUT BLEND
90% DISTILLED DISPROPORTIONATED TALL OIL FATTY ACID, 10% C21 DICARBOXYLIC ACID BLEND
50% OLEIC, 50% COCONUT BLEND
100% COCONUT
75% DISTILLED DISPROPORTIONATED TALL OIL FATTY ACID, 25% C21 DICARBOXYLIC ACID BLEND
C21 DICARBOXYLIC ACID
60% DISTILLED DISPROPORTIONATED TALL OIL FATTY ACID, 40% C21 DICARBOXYLIC ACID BLEND

DICARBOXYLIC ACID SOAPS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to novel soap compositions. More particularly, this invention relates to soap compositions containing a $C_{21}$ dicarboxylic acid soap having improved solubility characteristics and blends of the $C_{21}$ dicarboxylic acid soaps with other fatty acid soaps.

2. The Prior Art

Two considerations which are universal to fatty acid soap users are the saponifying agent used for the soap and the level of solids obtainable in maintaining a fluid soap. It seems in the majority of cases these two are related for of the two common saponifying agents, sodium and potassium, the potassium soap is much more soluble. Therefore, when relatively high solids soaps are desired, the potassium soap is the standard for fatty acids. In most cases the sodium soap would serve just as well and be cheaper to produce, but since it is much less soluble and tends to crystallize, it is normally avoided. For example, using potassium soaps, the highest solids soaps that are still fluid at room temperature are as follows:

| | Percent |
|---|---|
| Caprylic ($C_8$) | 45 |
| Capric ($C_{10}$) | 40 |
| Lauric ($C_{12}$) | 35 |
| Coconut (mixture of $C_{10}$, $C_{12}$, $C_{14}$) | 36 |
| Oleic ($C_{18}$) | 20 |
| Dimer acid ($C_{36}$) | 23 |

As is obvious, the shorter chain soaps are more soluble and fluid than oleic-type fatty acid. The same trend is apparent with the sodium soaps of the various acids except that solubilities are lower.

It has been found that the $C_{21}$ dicarboxylic acid soap compositions of this invention eliminate or lessen the problem of gelation and crystallization of fatty acid soaps at high solids content. It is therefore a general object of this invention to provide fatty acid soap compositions that are water soluble at high soap solids content. Another object of this invention is to provide soap compositions of soap blends of $C_{21}$ dicarboxylic acid and other fatty acids. Still another object of this invention is to provide liquid soap compositions as replacement for coconut fatty acids, oleic-type acids, and tallow in the production of liquid soap compositions. An even further object is to provide a soap using a variety of neutralizing agents and still retaining high water solubility.

Other objects, features and advantages of this invention will become apparent from the following description and the drawing, in which there is shown the relationship between viscosity and soap concentration of various fatty acid soaps and blends of fatty acid soaps.

SUMMARY OF THE INVENTION

Dicarboxylic acid soap compositions comprising a compound of the formula:

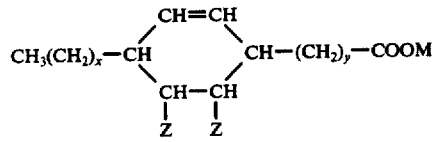

wherein x and y are integers from 3 to 9, x and y together equal 12, Z is a member of the group consisting of hydrogen and $COOM_1$, with one Z of each moiety, and M and $M_1$, are selected from the group consisting of hydrogen, sodium, potassium, lithium, ammonium, amines and mixtures thereof in an amount sufficient to impart detergency to said composition. The dicarboxylic acid soaps may be mixed or blended with from about 5% to about 90% by weight of soap solids of fatty acid soaps selected from the group consisting of coconut soaps, tallow soaps, tall oil soaps, soya soaps, oleic-acid soap, safflower soaps and mixtures thereof. Both the $C_{21}$ dicarboxylic acid soaps alone and the blends have a greater water solubility than fatty acids soaps.

DETAILED DESCRIPTION OF THE INVENTION

The essence of this invention is the discovery that when a mixture of predominantly 5 carboxy-4-hexyl-2-cyclohexene-1-octanoic acid and 6 carboxy-4-hexyl-2 cyclohexene-1-octanoic acid is converted into soap the isomer mixture formed provides not only the advantages of conventional soaps, such as coconut soaps, tallow soap and oleic soaps, but also provides additional advantages such as, in particular, increased water solubility. The mixture of these two isomers is represented by the general formula

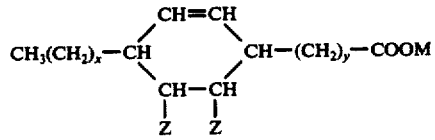

wherein x and y are integers from 3 to 9, x and y together equal 12, where Z is a member of the group consisting of hydrogen and $COOM_1$, with one Z of each moiety, and M and $M_1$ are selected from various neutralizing agents. Although the isomers wherein x is 5 and y is 7 form a preponderance of the composition, there are minor amounts of the $C_{21}$ dicarboxylic acid where cyclohexene ring varies in position along the carbon chain. For the purpose of this specification, compositions of the general formulation shown above are termed "$C_{21}$ dicarboxylic acid soaps" and in the acid form are termed "$C_{21}$ dicarboxylic acid."

The $C_{21}$ dicarboxylic acids used in this invention are produced from linoleic acid of various animal, vegetable and tall oil sources. The $C_{21}$ dicarboxylic acids may be made by reacting linoleic acid with acrylic acid and catalytic amounts of iodine. One such process for making the dicarboxylic acids for use in the soaps of this invention is set forth in my co-pending application, Ser. No. 159,070 filed July 2, 1971.

The $C_{21}$ dicarboxylic acid soaps are made by neutralizing the $C_{21}$ dicarboxylic acid. The neutralizing agent used is based on the solubility characteristics desired in the soap and economic considerations. The neutralizing agents contemplated include those of the following cations, sodium, potassium, lithium and ammonium. These cations may be obtained from such inorganic alkalis as caustic soda, caustic potash, and soda ash. Another cation which may be used is the ammonium cation. Organic amines may also be used, specifically amines such as triethylamine, monoethylamine, diethylamine, and alkanolamines, such as ethanolamine, triethanolamine and diethanolamine. The soaps made from the above listed neutralizing agents are all liquid at temperatures as low as 30° F.

In another aspect of this invention, it has been found that the $C_{21}$ dicarboxylic acid soaps are not only more soluble themselves, but lend increased water solubility to soaps made by blending the $C_{21}$ dicarboxylic acid soaps with other fatty acid soaps, such as oleic acid soap and coconut soaps. For example, the potassium soap of oleic acid is a viscous fluid at about 18% solids and gels at 19%-20% solids. However, the potassium soap of oleic acid blended with 40% $C_{21}$ dicarboxylic acid potassium soap is very fluid at 30 to 40% solids. This general characteristic of increased solubility is advantageous to all soap users for economy in shipping and handling. It also allows for cuts in production costs in applications where water is removed from the final product, since less water is added with the soap when a $C_{21}$ dicarboxylic acid soap is used. This increased solubility also provides some very unique properties in applications where the soap is involved intimately in the system since its degree of contact due to solubility is increased. For the purposes of this specification, when blends of fatty acid soaps, i.e., coconut fatty acids are referred to, the term is meant to include also the oil from which the fatty acid is derived, i.e., coconut oil, where appropriate.

A property of the soaps which points up this solubility advantage of $C_{21}$ dicarboxylic acid soap and which is also important for $C_{21}$ dicarboxylic acid utility is the viscosity of the soap. If viscosity of the solution at 25° C. is plotted against percentage real soap, curves are obtained which dramatically demonstrate the superior characteristics of the $C_{21}$ dicarboxylic acid soap. The solubility of the various soaps may be illustrated by the viscosity of the soaps which is shown in the accompanying figure. Whereas, the viscosity of the potassium soap solution of oleic acid exceeds twenty centipoises at 16% real soap, a solution of the poassium soap of $C_{21}$ dicarboxylic acid does not exceed twenty centipoises until it is 35% real soap. The coconut fatty acid potassium soap is somewhat poorer than the $C_{21}$ dicarboxylic acid soap since its viscosity goes above twenty centipoises at 30% real soap. The $C_{21}$ dicarboxylic acid soap also makes low viscosity blends with oleic acid soap as it does with the coconut soap.

When making liquid soaps, other additives commonly used may be included in the final compositions. Among these include minor amounts of coloring agents, perfumes and antimicrobial agents. One such agent used is the disinfectant pine oil, which is readily compatible with $C_{21}$ dicarboxylic acid soap solutions. The liquid soaps may have as little as 2.5% water, but for easier dispensing and handling, the liquid soap contains less than 60% water or, in other words, the real soap content of the $C_{21}$ dicarboxylic acid soaps may be greater than 40% for economy in shipping.

Another property which is applicable to $C_{21}$ dicarboxylic acids in any application is the ability to form a soluble mono soap. Most fatty acid soaps are made from molecules containing one acid group per molecule and before that molecule can become water-soluble it must be converted to the soap. In contrast, the $C_{21}$ dicarboxylic acid becomes water-soluble when only one-half of the carboxyl groups exist as carboxylate anions. Since each molecule of $C_{21}$ dicarboxylic acid has two carboxyl groups of varying acidity it is possible to convert the most acidic of these to the soap and the molecule becomes water-soluble leaving a free acid group on each molecule. These mono soap solutions have a pH of about 6.6 and are soluble over a broad solids range, i.e., 2% to 99+% on water. The mono soaps of potassium, sodium, ammonia, and organic amines all show the same type properties. Of course, the fact that the mono soap is water-soluble allows one to have considerable leverage in the amount of free acid and thus the pH of a soap solution. A soap solution of $C_{21}$ dicarboxylic acid can be prepared at any pH above 6.5, so in the case of amine soaps one can prepare the soap in such a way as to have free acid groups rather than excess amine, so there is no amine odor.

The $C_{21}$ dicarboxylic acid soaps have great utility strictly as soaps. In the liquid hand soap application, the viscosity must be kept at a very low level for economics of shipping and ease of dispensing the soap. This is the main reason that coconut fatty acids are currently used in this area. The hospital scrub soaps on the other hand do not have to be as economical, so $C_{18}$ type fatty acid mixtures are often used at low concentrations. Thus, the obvious advantages of $C_{21}$ dicarboxylic acid soaps in this area would be for preparing more concentrated soaps and for cutting costs by using sodium cations. Several liquid cleaners currently on the market use fatty acids as the soap component and more will switch from synthetic detergents to fatty acids as more emphasis is placed on ecology. If liquid soaps, whether they be hand soaps, hospital scrub soaps, dishwashing liquids, floor cleaners, or others are to be made from oleic-type fatty acids, the maximum amount of soap that can be present in water is about 15%. If short chain coconut fatty acids are used this percentage can be raised to about 35%, but at the percentages higher than 20% the viscosity increases rapidly. Currently, $C_{18}$ fatty acids are used only in the hospital scrub soaps and in liquid hand soaps; however, with the variable concentrations and cations available when $C_{21}$ dicarboxylic acid is used, a decrease in use of synthetic detergents could result. Liquid hand soaps normally have a perfume in them, pine oil being the most common. Pine oil is very compatible with the $C_{21}$ dicarboxylic acid soaps and therefore, perfuming is no problem.

A product similar to the liquid soaps in composition is shampoo. Basically, shampoos are simply perfumed soap solutions which need to lather easily and which have a fairly high soap content. Consequently, most shampoos consist from 50% to 100% of the solids as coconut fatty acid soaps. With such a formulation a viscous potassium soap of about 35% real soap (solids) can be prepared. If the triethanolamine soap is used, a 40% real soap may be formulated. As is obvious from the earlier discussion, $C_{21}$ dicarboxylic acid soap would allow for greater flexibility in the amount of soap present in the shampoo and also allow for the utility of a lower priced cation, sodium. The problem of coconut fatty acids' tendency to cause skin irritation might also be eliminated.

The following examples are illustrative of the practice of this invention.

EXAMPLE 1

As one of the advantages of this invention is to produce a high concentration liquid, i.e., liquid above 20% solids concentration, the water solubility characteristics of a number of conventionally used fatty acid soaps were compared to the $C_{21}$ dicarboxylic acid soaps of this invention. Likewise, just as the type of fatty acid used influences soap properties, so does the choice of neutralizing agent. Therefore, various available inorganic alkalis were also compared.

The procedure for making the fatty acid soaps was to dissolve the inorganic alkali in the prescribed amount of water, heating to 150° F. The fatty acid was slowly added to the alkali solution and agitated for a few minutes. The characteristics of each formulation are shown in the table below.

SOLUBILITIES OF VARIOUS FATTY ACID SOAPS IN WATER

| Fatty acid used | Cation | Percent solids | Characteristics |
|---|---|---|---|
| Octanoic acid ($C_8$) | K | 40 | Viscous solution. |
| " | K | 45 | Gel. |
| Nonanoic acid ($G_9$) | K | 35 | Viscous solution. |
| " | K | 40 | Gel. |
| Decanoic acid ($C_{10}$) | K | 35 | Viscous solution. |
| " | K | 40 | Gel. |
| Lauric acid ($C_{12}$) | K | 33 | Viscous solution. |
| " | K | 36 | Gel. |
| Coconut fatty acids | K | 38 | Viscous solution. |
| " | K | 38 | Gel. |
| " | Na | 15 | Precipitate. |
| Distilled disproportionated: | | | |
| Tall oil fatty acid ($C_{18}$) | K | 18 | Solution. |
| " | K | 21 | Gel. |
| " | Na | 5 | Precipitated. |
| Vegetable derived oleic acid ($C_{18}$) | K | 18 | Solution. |
| " | K | 20 | Gel. |
| Dimer acid of oleic-linoleic ($C_{36}$) | K | 20 | Solution. |
| " | K | 23 | Gel. |
| $C_{21}$ dicarboxylic acid | K | 20 | Solution. |
| " | K | 40 | " |
| " | K | 60 | " |
| " | K | 80 | Viscous solution. |
| " | Na | 20 | Solution. |
| " | Na | 40 | " |
| " | Na | 65 | Viscous solution. |
| Distilled disproportionated: | | | |
| Tall oil fatty acid ($C_{18}$) | Li | 10 | Insoluble. |
| Coconut fatty acids | Li | 10 | " |
| $C_{21}$ dicarboxylic acid | Li | 10 | Solution. |
| " | Li | 20 | " |
| " | $NH_3$ | 10 | " |

The results show that the soaps of $C_{21}$ dicarboxylic acid are water soluble at higher solids content than are soaps of conventional fatty acids, such as coconut fatty acids, vegetable derived oleic acid and tall oil fatty acids, among others. Also the potassium soaps are more soluble than sodium.

EXAMPLE 2

Another aspect of this invention is that the $C_{21}$ dicarboxylic acid soaps when blended with other fatty acid soaps such as tall oil fatty acid soaps, gives a blended mixture having a greater water solubility than the conventional fatty acid used alone. To illustrate this point, the sodium and potassium soaps of $C_{21}$ dicarboxylic acid were mixed at varying ratios and solids contents up to the point of gelling. The $C_{21}$ dicarboxylic acid used to prepare all of these blends was actually about 93% $C_{21}$ dicarboxylic acid, 3% $C_{36}$ dimer acids and about 4% fatty acids. The fatty acid soap used as a distilled, disproportionated tall oil fatty acid sold by Westvaco Corporation under the trademark "Westvaco" 1480. The results of the potassium soap blends are shown in Table IIA wherein the $C_{21}$ dicarboxylic acid soap is referred to as "diacid" and the distilled, disproportionated tall oil fatty acid soap is referred to as "fatty acid."

TABLE IIA

WATER SOLUTIONS OF POTASSIUM SOAPS

| Soap composition | | Soap, percent solids | | | | | | | | | |
|---|---|---|---|---|---|---|---|---|---|---|---|
| Fatty acid | Diacid | 10 | 20 | 30 | 40 | 50 | 60 | 70 | 80 | 90 | 99 |
| 100 | 0 | S | G | | | | | | | | |
| 90 | 10 | S | S | B | G | | | | | | |
| 80 | 20 | S | S | S | G | | | | | | |
| 70 | 30 | S | S | S | G | | | | | | |
| 60 | 40 | S | S | S | B | G | | | | | |
| 50 | 50 | S | S | S | S | G | | | | | |
| 40 | 60 | S | S | S | S | VS | G | | | | |
| 30 | 70 | S | S | S | S | VS | VS | VS | G | | |
| 20 | 80 | S | S | S | S | VS | VS | VS | VS | G | |
| 0 | 100 | S | S | S | S | S | S | S | S | VS | VS |

Notes S = Clear, fluid solution: VS = Solution but not fluid at 25° C.; G = Gelled while mixing or soon thereafter; B = Borderline, tending to gel but not actually set up.

The soap of the 100% tall oil fatty acid soap was a gel at 20% solids content, but as the amount of $C_{21}$ dicarboxylic acid soap blended was increased, the percentage of soap solids allowable in forming a solution increased. For example, a 20% clear soap of fatty acid required 10% $C_{21}$ dicarboxylic acid soap, a 30% solids solution required $C_{21}$ dicarboxylic acid soap, etc. Once the soap could not be formed or gelled as it formed, no higher concentrations were attempted with that blend since it was assumed the results would be the same.

In Table IIB there is reported the same study except sodium cations were used with the same tall oil fatty acid and $C_{21}$ dicarboxylic acid instead of potassium cations.

TABLE IIB
WATER SOLUTIONS OF SODIUM SOAPS

| Soap composition | | Soap, percent solids | | | | | | | | | |
|---|---|---|---|---|---|---|---|---|---|---|---|
| Fatty acid | Diacid | 10 | 20 | 30 | 40 | 50 | 60 | 70 | 80 | 90 | 99 |
| 100 | 0 | G | | | | | | | | | |
| 90 | 10 | G | | | | | | | | | |
| 80 | 20 | S | G | | | | | | | | |
| 70 | 30 | S | G | | | | | | | | |
| 60 | 40 | S | S | G | | | | | | | |
| 50 | 50 | S | S | S | S | G | | | | | |
| 40 | 60 | S | S | S | S | VS | G | | | | |
| 30 | 70 | S | S | S | S | VS | VS | VS | B | | |
| 20 | 80 | S | S | S | S | VS | VS | VS | VS | VS | G |
| 0 | 100 | S | S | S | S | S | S | VS | VS | VS | VS |

Notes S = Clear, fluid solution: VS = Solution but not fluid at 25° C.; G = Gelled while mixing or soon thereafter; B = Borderline, tending to gel but not actually set up.

As is shown, the sodium $C_{21}$ dicarboxylic acid soap increases the solubility of the sodium tall oil fatty acid soap. Since the initial solubility is so much less than with potassium soap, about 20% $C_{21}$ dicarboxylic acid soap must be present before the 10% soap is a clear solution.

EXAMPLE 3

It is often desirable when making [liqid] *liquid* soaps, as well as toilet soaps, having tailored properties, to blend together various fatty acids to achieve desirable characteristics and lessen the undesirable ones. This example illustrates that blending the $C_{21}$ dicarboxylic acid with the typically used tallow fatty acids, coconut fatty acids and vegetable derived oleic acids gives blends having water solubility greater than the typical fatty acid used alone. The potassium soaps were made and the results are shown in the table below.

TABLE III

| Soap | Percent solids | Characteristics at 25° C. |
|---|---|---|
| 100% coconut fatty acid | 33 | Gel. |
| 90% diacid/10% coconut acid | 40 | Solution. |
| 50% diacid/50% coconut acid | 40 | " |
| 100% tallow | 5 | Gel. |
| 50% diacid/50% tallow | 5 | Turbid solution. |
| " | 10 | " |
| 100% vegetable derived oleic acid | 20 | Gel. |
| 20% diacid/80% vagetable oleic | 25 | Solution. |

The results show the increased water solubility obtained from the blends of coconut acid, tallow and oleic acid with $C_{21}$ dicarboxylic acid as compared to the fatty acids used alone.

EXAMPLE 4

This example illustrates a comparison of viscosity changes with potassium solids. Liquid soaps of fatty acids must be fairly fluid for ease in dispensing and using them. Therefore, a measure of the change in viscosity of a soap solution as percentage soap present increases is an easy method for determining the concentration of soap that can be used. The curves in the accompanying FIGURE show this relationship. A Brookfield viscometer was used to determine these curves at 25° C. As is shown by the graph, the $C_{21}$ discarboxylic acid soap and blends containing $C_{21}$ dicarboxylic acid soap are significantly better than oleic-type soap and coconut fatty acid soap as far as increase in viscosity with soap solids is concerned. The fact that 50% oleic acid/50% coconut soap is required to obtain a viscosity of 20 cps. at 30% real soap; whereas only 25% $C_{21}$ dicarboxylic acid soap/75% tall oil fatty acid is needed to reach the same viscosity level is typical of the significance of the $C_{21}$ dicarboxylic acid soaps.

EXAMPLE 5

To demonstrate that amine soaps of $C_{21}$ dicarboxylic acid could be easily prepared at a variety of concentrations the following soaps were prepared. The triethylamine soap of $C_{21}$ dicarboxylic acid was prepared by mixing the two together at room temperature. A clear fluid soap immediately formed having a solids content of about 90%. This soap was diluted slowly with water down to 25% solids. It showed no signs of gelling at any concentration. When the same procedure was tried with oleic acid a gel formed immediately upon the addition of water.

The $C_{21}$ dicarboxylic acid-amine soaps were also pepared using diethanolamine and monoethanol amine. All of the amine soaps showed unusual solubility just as had the sodium and potassium soaps.

EXAMPLE 6

Like the full soaps, the mono-soaps of $C_{21}$ dicarboxylic acid are soluble in water at high solids levels. Of course, these soaps all have a pH of about 6.7 and have one free carboxylic acid group in solution. The mono-soap is prepared by simply adding one equivalent of base to the $C_{21}$ dicarboxylic acid and allowing the solution to reach equilibrium. An example of utility for a mono-soap is in the textile industry where fiber processing aids are of great importance. A piece of cotton was soaked in a 10% solution of a mono potassium soap of $C_{21}$ dicarboxylic acid and then dried, the cloth absorbed 1.8% of its weight in the soap which could not be washed out with water. The absorbed soap gave the cloth better hand when wet or dry. The mono-soap was easily removed by passing the cloth through caustic to convert the mono-soap to the di-soap which was readily washed out.

EXAMPLE 7

Since the $C_{21}$ dicarboxylic acid has two acid groups of different strengths, it is very easy to prepare the mono or half soap of the diacid. To demonstrate the effectiveness of making a half soap of $C_{21}$ dicarboxylic acid, one-half the required amount of triethylamine was added to the $C_{21}$ dicarboxylic acid. The result was a very soluble mono soap. The same results were obtained using one-half the amounts of diethanolamine and monoethanolamine.

EXAMPLE 8

To demonstrate that the $C_{21}$ dicarboxylic acid soap could be used in liquid soaps, several soaps were prepared in accordance with typical formulations. The formulation used was 12% coconut fatty acids, 3% soya or tall oil fatty acid, 4.4% KOH, 1% KCL, 80% water and a perfume as desired. In all of the soaps pine oil was added as the perfume at 3% addition.

If an oleic acid is used in place of the coconut fatty acids a very viscous soap of questionable utility results. However, when the potassium soap of $C_{21}$ dicarboxylic acis was used in place of the coconut fatty acids a very fluid soap with good foaming properties resulted. The pine oil was compatible with the $C_{21}$ dicarboxylic acid soap formulation. Of course, with $C_{21}$ dicarboxylic acid soap much more concentrated, fluid soaps were prepared.

To further test the advantages of $C_{21}$ dicarboxylic acid soap in liquid soaps, sodium hydroxide was substituted for the potassium hydroxide in each of the formulations mentioned above. As expected, the systems using oleic acid were gels, the system with coconut fatty acids was a liquid but precipitated after several days, and the system containing the $C_{21}$ dicarboxylic acid was very fluid and showed no signs of precipitating after three months. In all of these formulations the excess base was kept at a very low level so that the pH's were about 9 for the $C_{21}$ dicarboxylic acid and coconut fatty acid systems and about 11 for the oleic acid systems.

EXAMPLE 9

An area closely related to the liquid soaps is shampoos. The formulations are similar but, since profuse sudsing is desired in shampoos and since low viscosity is not critical, the real soap content is more than twice as high. To get 35% soap in a formulation, coconut fatty acids or a blend of 50% coconut-50% oleic must be used. A 40% soap shampoo can be prepared using triethanolamine rather than potassium hydroxide to form the soap. As would be expected from the previous work, very comparable shampoos were prepared using $C_{21}$ dicarboxylic acid or a $C_{21}$ dicarboxylic acid-oleic blend. $C_{21}$ dicarboxylic acid has a major economic advantage in this application since sodium hydroxide could be used instead of potassium hydroxide. Also more concentrated soaps can be made using $C_{21}$ dicarboxylic acid since it does not gel even at 99% solids.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A soap composition consisting of a compound of the formula

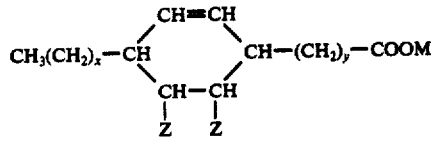

wherein x and y are integers from 3 to 9, x and y together equal 12, Z is a member of the group consisting of H and $COOM_1$, with one Z of each moiety, and M and $M_1$ are selected from the group consisting of [hydrogen,] sodium, potassium, lithium, ammonium and mixture thereof.

2. The soap composition of claim 1 wherein M and $M_1$ are sodium.

3. The soap composition of claim 1 wherein M and $M_1$ are potassium.

4. A liquid soap composition consisting essentially of a compound of the formula

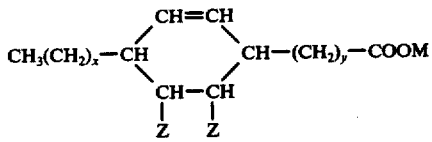

wherein x and y are integers from 3 to 9, x and y together equal 12, Z is a member of the group consisting of H and $COOM_1$, with one Z of each moiety, and M and $M_1$ are selected from the group consisting of [hydrogen,] sodium, potassium, lithium, ammonium and mixtures thereof present in an amount of 5% to 95% by weight soap solids; a soap selected from the group consisting of coconut fatty acids, tallow fatty acids, tall oil fatty acids, oleic acid, soya fatty acids, safflower fatty acids, and mixtures thereof being present in the amount of 90% to 5% by weight soap solids.

5. The soap composition of claim 4 wherein M and $M_1$ are sodium.

6. The soap composition of claim 4 wherein M and $M_1$ are potassium.

7. The soap composition of claim 4 wherein said soap is a tall oil fatty acid soap.

8. The soap composition of claim 4 wherein said soap is an oleic acid soap.

9. The soap composition of claim 4 containing from about 40% to 60% by weight real soap content.

10. The liquid soap composition of claim 4 further containing less than 60% water.

11. The soap composition of claim 10 being liquid and containing less than 15% water.

12. A soap composition consisting of a compound of the formula

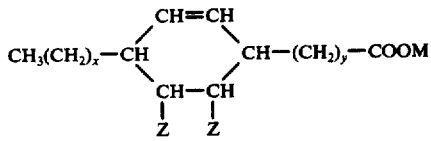

wherein x and y are integers from 3 to 9, x and y together equal 12, Z is a member of the group consisting of H and $COOM_1$, with one Z of each moiety, and M and $M_1$ are selected from the group consisting of [hydrogen,] *cations of* inorganic alkalis, and [organic amines] *triethylamine, diethylamine, monoethylamine, diethanolamine and ethanolamine.*

[13. The soap composition of claim 12 wherein M and $M_1$ are both amines selected from the group consisting of triethylamine, diethylamine, monoethylamine, diethanolamine and ethanolamine.]

[14. The soap composition of claim 12 wherein M is hydrogen and $M_1$ is an organic amine.]

*15. A soap composition consisting of a compound of the formula*

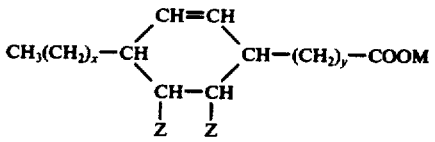

*wherein x and y are integers from 3 to 9, x and y together equal 12, Z is a member of the group consisting of H and COOH with one Z of each moiety, and M is selected from the group consisting of sodium, potassium, lithium, ammonium and mixtures thereof.*

*16. The soap composition of claim 15 wherein M is sodium.*

*17. A liquid soap composition consisting essentially of a compound of the formula*

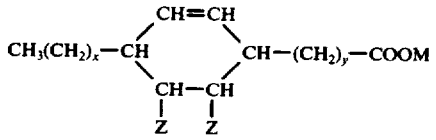

*wherein x and y are integers from 3 to 9, x and y together equal 12, Z is a member of the group consisting of H and COOH with one Z of each moiety, and M is selected from the group consisting of sodium, potassium, lithium, ammonium and mixtures thereof, said compound being present in an amount of 5% to 95% by weight soap solids; and a soap selected from the group consisting of coconut fatty acids, tallow fatty acids, tall oil fatty acids, oleic acid, soya fatty acids, safflower fatty acids, and mixtures thereof being present in the amount of 90% to 5% by weight soap solids.*

*18. A soap composition consisting of a compound of the formula*

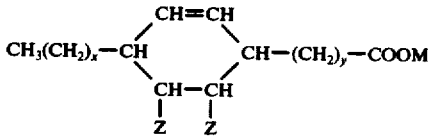

*wherein x and y are integers from 3 to 9, x and y together equal 12, Z is a member of the group consisting of H and COOH with one Z of each moiety, and M is selected from the group consisting of cations of inorganic alkalis, triethylamine, diethylamine, monoethylamine, diethanolamine and ethanolamine.*

* * * * *

UNITED STATES PATENT OFFICE

CERTIFICATE OF CORRECTION

PATENT NO. : Re. 29,337

DATED : August 2, 1977

INVENTOR(S) : Benjamin F. Ward

It is certified that error appears in the above-identified patent and that said Letters Patent are hereby corrected as shown below:

Column 3, line 46, "poassium" should read --potassium--.

Column 7, in Table III, under 100% coconut fatty acid, "33" should read --38--.

Signed and Sealed this

*Twenty-eighth* Day of *November 1978*

[SEAL]

*Attest:*

RUTH C. MASON
*Attesting Officer*

DONALD W. BANNER
*Commissioner of Patents and Trademarks*